US008587520B2

(12) United States Patent
Hsu et al.

(10) Patent No.: US 8,587,520 B2
(45) Date of Patent: Nov. 19, 2013

(54) GENERATING POSITION INFORMATION USING A VIDEO CAMERA

(75) Inventors: Feng-Hsiung Hsu, Cupertino, CA (US); Rui Gao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/208,003

(22) Filed: Aug. 11, 2011

(65) Prior Publication Data

US 2011/0300940 A1  Dec. 8, 2011

Related U.S. Application Data

(63) Continuation of application No. 11/428,279, filed on Jun. 30, 2006, now Pat. No. 8,013,838.

(51) Int. Cl.
*G06F 3/033* (2013.01)
*G09G 5/08* (2006.01)

(52) U.S. Cl.
USPC .............................. 345/158; 345/161; 463/36

(58) Field of Classification Search
USPC ....................... 345/157–163; 348/135; 463/36
See application file for complete search history.

(56) References Cited

U.S. PATENT DOCUMENTS

| 5,181,181 A | 1/1993 | Glynn |
| 5,227,985 A | 7/1993 | DeMenthon |
| 5,461,478 A | 10/1995 | Sakakibara et al. |
| 5,617,312 A | 4/1997 | Iura et al. |
| 5,686,942 A | 11/1997 | Ball |
| 5,784,282 A | 7/1998 | Abitbol et al. |
| 5,795,306 A | 8/1998 | Shimotani et al. |
| 5,818,424 A | 10/1998 | Korth |
| 5,856,844 A | 1/1999 | Batterman et al. |
| 5,926,168 A | 7/1999 | Fan |
| 6,417,836 B1 | 7/2002 | Kumar et al. |
| 6,456,728 B1 | 9/2002 | Doi et al. |
| 6,522,312 B2 | 2/2003 | Ohshima et al. |
| 6,538,645 B1 | 3/2003 | Juang et al. |

(Continued)

FOREIGN PATENT DOCUMENTS

| JP | 07005983 | 1/1995 |
| JP | 9034633 A | 2/1997 |

(Continued)

OTHER PUBLICATIONS

Cutler, et al., "View-based Interpretation of Real-time Optical Flow for Gesture Recognition", Proc. Third IEEE Conference on Face Gesture Recognition, Nara, Japan, Apr. 1998, 6 pages.

(Continued)

*Primary Examiner* — Kevin M Nguyen
*Assistant Examiner* — Kenneth B Lee, Jr.
(74) *Attorney, Agent, or Firm* — Lee & Hayes, PLLC

(57) ABSTRACT

Some implementations provide techniques and arrangements to receive image information. A plurality of reference fields of a user-manipulated device may be identified. Each reference field of the plurality of reference fields may include reference elements. The plurality of reference fields may be identified based on colors of the reference elements, shapes of the reference elements, and/or a pattern of the reference elements. Some implementations may generate position information based on the plurality of reference fields. The position information may identify a position of the user-manipulated device relative to the video camera. Some implementations may provide the position information to an application.

20 Claims, 6 Drawing Sheets

(56) References Cited

U.S. PATENT DOCUMENTS

| | | |
|---|---|---|
| 6,720,949 B1 * | 4/2004 | Pryor et al. .................. 345/158 |
| 6,795,068 B1 | 9/2004 | Marks |
| 6,863,609 B2 | 3/2005 | Okuda et al. |
| 6,921,332 B2 | 7/2005 | Fukunaga et al. |
| 6,987,504 B2 | 1/2006 | Rosenberg et al. |
| 7,489,299 B2 | 2/2009 | Liberty et al. |
| 7,711,146 B2 | 5/2010 | Tu et al. |
| 7,920,718 B2 | 4/2011 | Marrion et al. |
| 2002/0039111 A1 | 4/2002 | Gips et al. |
| 2002/0126090 A1 | 9/2002 | Kirkpatrick et al. |
| 2003/0052859 A1 | 3/2003 | Finley |
| 2005/0062719 A1 | 3/2005 | Hinckley et al. |
| 2005/0068198 A1 | 3/2005 | Brega et al. |
| 2006/0050052 A1 * | 3/2006 | Mekenkamp et al. ........ 345/156 |
| 2006/0264259 A1 * | 11/2006 | Zalewski et al. ................ 463/36 |
| 2006/0287083 A1 | 12/2006 | Ofek et al. |
| 2007/0058047 A1 * | 3/2007 | Henty ..................... 348/211.99 |
| 2007/0257884 A1 | 11/2007 | Taira et al. |
| 2007/0273464 A1 | 11/2007 | Kitahara et al. |
| 2008/0024435 A1 | 1/2008 | Dohta |
| 2008/0100825 A1 | 5/2008 | Zalewski |
| 2008/0117167 A1 | 5/2008 | Aonuma et al. |
| 2009/0009596 A1 | 1/2009 | Kerr et al. |

FOREIGN PATENT DOCUMENTS

| | | |
|---|---|---|
| JP | 2000181601 A | 6/2000 |
| JP | 20011236181 A | 8/2001 |
| JP | 2006079249 A | 3/2006 |
| JP | 2007005983 A | 1/2007 |
| KR | 20040027561 (A) | 4/2004 |

OTHER PUBLICATIONS

Hinckley, et al., "The VideoMouse: A Camera-Based Multi-Degree-of-Freedom Input Device," UIST'99, ACM 1999, CHI Letters, vol. 1, pp. 103-112.

Jeon, et al., "Interaction Techniques in Large Display Environments using Hand-held Devices", VRST'06, ACM, 2006, pp. 4.

Murph, "Sony patents LED-infused, motion-tracking controller", retrieved on May 3, 2007, at <<http://www.engadget.com/2006/12/14/sony-patents-led-infused-motion-tracking-controller/>>, engadget, Weblogs, Inc., Dec. 14, 2006, pp. 1-6.

Office Action for U.S. Appl. No. 11/774,515, mailed on Jul. 21, 2011, Feng-Hsiung Hsu, "Multi-Axis Motion-Based Remote Control".

"SmartNAV3 AT: How It Works," available at <<http://www.naturalpoint.com/smartnav/products/at/at_howitworks.html>>, accessed on Apr. 19, 2006, 2 pages.

TrackIR product Description, available at <<http://www.naturalpoint.com/trackir/02-products/product-how-TrackIR-works.html>>, accessed on Apr. 9, 2006, 2 pages.

Office Action for U.S. Appl. No. 11/774,515, mailed on Jan. 5, 2012, Feng-Hsiung Hsu, "Multi-Axis Motion-Based Remote Control", 31 pgs.

* cited by examiner

GENERATING POSITION INFORMATION USING A VIDEO CAMERA

RELATED APPLICATION

This application is a continuation of and claims priority from U.S. patent application Ser. No. 11/428,279, titled "Generating Position Information Using a Video Camera", filed on Jun. 30, 2006, and hereby incorporated by reference.

BACKGROUND

Many different kinds of devices exist which allow a user to control an application. The user may manipulate these types of devices to control an on-screen pointer, to control the behavior of a game figure, and so on. The most prevalent of such devices include keyboards, mouse devices, joy sticks, trackballs, voice recognition tools, and so on. Less common types of control devices include data gloves, inertial sensors, radio positioning mechanisms, and so on.

Known control devices may have various shortcomings. For instance, some control devices may not capture user input with sufficient degrees of freedom (DOF) to control certain applications. Other control devices may provide position information that is not sufficiently precise or reliable. Other control devices may be cumbersome to use. Other control devices may be prohibitively expensive. Known control devices may suffer from yet other shortcomings

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide techniques and arrangements to generate positioning information using a video camera. For example, in some implementations a position determination module receives image information from a video camera. The position determination module may identify at least one reference field in the image information to provide identified reference information. The position determination module may generate position information based on the identified reference information. The position information is associated with a position of the reference field with respect to the video camera. The video camera may be stationary and the reference field may be coupled to a user-manipulated device.

The position information may be used to control an application. For example, an application may use the position information to control the position of a marker (e.g., an on-screen pointer) on a display device. As another example, a game application may use the position information to perform a particular action or set of actions with respect to an object in a game. Still other uses of the position information are possible.

In some implementations, the reference field may comprise a defined pattern of plural reference elements. The reference elements can comprise, for example, infrared or visible-spectrum light emitting elements.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

A. Exemplary System (FIGS. 1-6)

Generally, any of the functions described with reference to the figures can be implemented using software, hardware (e.g., fixed logic circuitry), manual processing, or a combination of these implementations. The term "logic, ""module" or "functionality" as used herein generally represents software, hardware, or a combination of software and hardware. For instance, in the case of a software implementation, the term "logic," "module," or "functionality" represents program code (or declarative content) that is configured to perform specified tasks when executed on a processing device or devices (e.g., CPU or CPUs). The program code can be stored in one or more computer readable media.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

Figure 2:
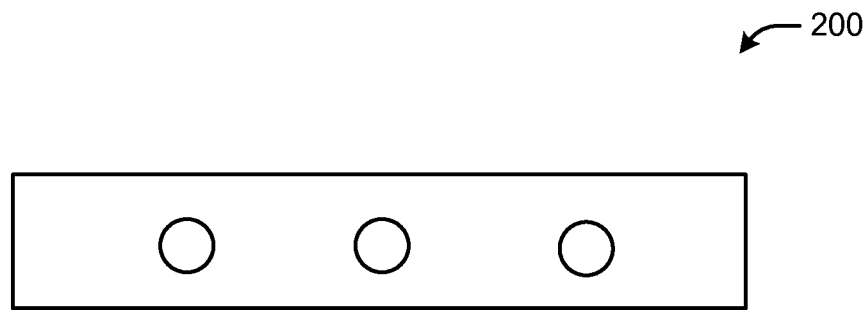
FIGS. 2 and 3 show different exemplary configurations of a reference field that can be coupled to a user-manipulated device in the system of FIG. 1.
Figure 3:
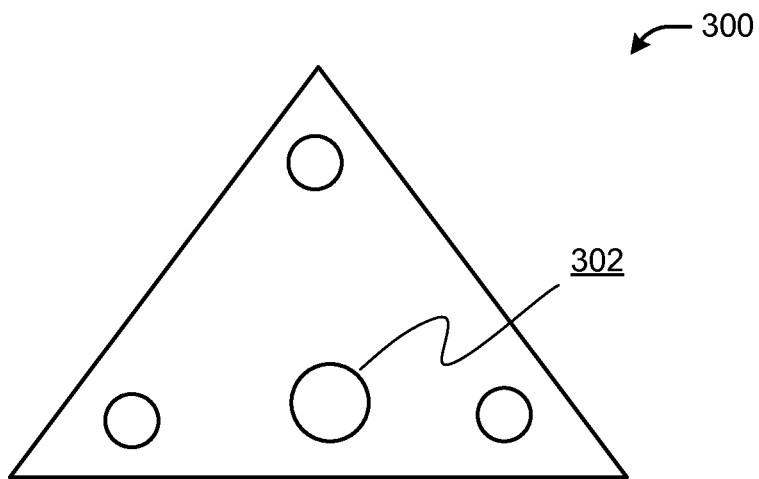

A.1. Implementation A: Stationary Video Camera (FIGS. 1-3)

Figure 1:
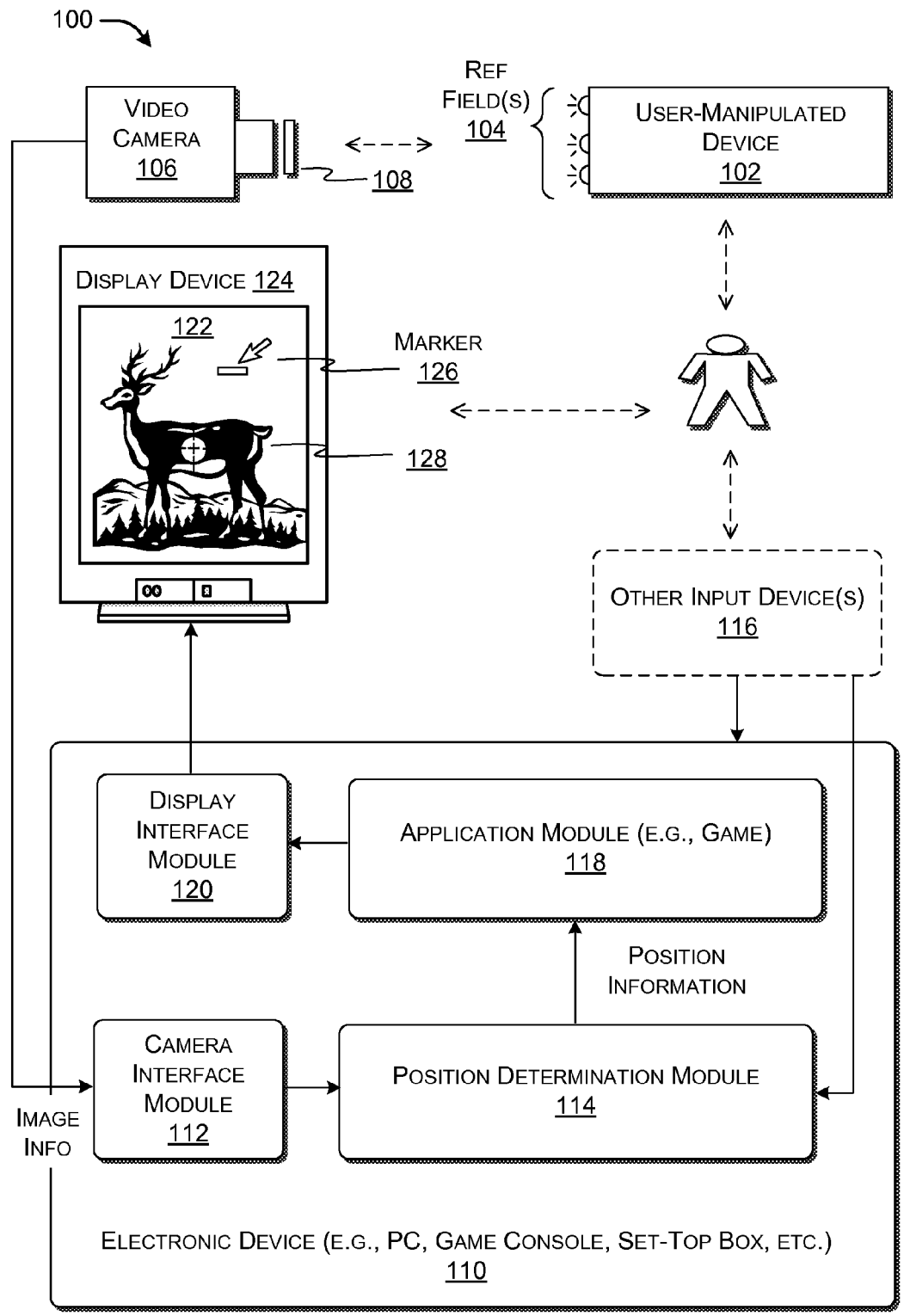
FIG. 1 shows a first implementation of a system for controlling an application based on image information.

FIG. 1 sets forth a system 100 which provides a first implementation of the strategy. In this system 100, a user manipulates a user-manipulated device 102 to interact with an application. The user-manipulated device 102 can include any kind of control mechanism, including a remote control device, any kind of game control device, and so forth. The user-manipulated device 102 may represent a handheld device that the user can move about (with the user's hands) to achieve a desired control operation. Or the user-manipulated device 102 may represent a device with one or more members that the user can separately move about to achieve a desired control operation. Or the user-manipulated device 102 can comprise a device that is worn by the user, such as a data glove-type device, a wristband-type device, a headband-type or hat-type device, a shoe-borne device, and so forth (or any combination thereof).

Although not shown, the user-manipulated device 102 can also include any variety of control actuators (buttons, joysticks, knobs, steering mechanisms, etc.) to provide input commands and other selections.

One or more reference fields 104 are affixed to the user-manipulated device 102 (or otherwise placed in a defined positional relationship with the user-manipulated device 102). To facilitate discussion, this subsection will assume that the user-manipulated device 102 includes a single reference field 104. The reference field 104 can be composed of one or more reference elements. In one exemplary case, a reference element can comprise a light emitting element, such as a light emitting diode (LED). For instance, the reference field 104 can be composed of one or more infrared LEDs, one or more visible-spectrum LEDs, and so forth. In the case of visible spectrum LEDs, one or more primary color LEDs can be used to help distinguish the LEDs from other objects in a scene. These LEDs can also be placed on a darkened background to better distinguish the LEDs from other objects in a scene. In yet another implementation, one or more passive reference elements can be used that do not independently generate electromagnetic energy. For instance, the reference field 104 can be composed of one or more reflective dots that can be distinguished by virtue of their telltale reflectance of infrared radiation or visible-spectrum light.

In addition, to help discriminate the reference field 104 from other objects, the reference field 104 can arrange its reference elements in a predetermined pattern. FIGS. 2 and 3, to be described below, illustrate two such exemplary patterns of reference elements.

A video camera 106 captures image information. The image information provides a depiction of a scene that includes the reference field 104 (or at least part thereof). To function in this manner, the video camera 106 can be positioned so that its field of view encompasses an area in which the user is expected to be operating the user-manipulated device 102. For instance, in one example, the video camera 106 can be positioned on a ceiling above a user station. In another case, the video camera 106 can be positioned on a wall, pointed at the user. In still another example, the system 100 can include two or more video camera (not shown) which capture a scene from plural respective angles.

In the featured implementation, the video camera 106 does not move. In other cases, the video camera 106 can move. For instance, the system 100 can include a video camera 106 which sweeps back and forth, or which is moves in some other way.

The video camera 106 can comprise any kind of commercial or application-specific camera for capturing image information. Conventional video includes a series of frames that digitally depict a scene in different successive temporal states. The video camera 106 may include a conventional CCD array to receive the image information. The video camera 106 may optionally include one or more filters 108 configured to selectively pass electromagnetic radiation having a prescribed frequency. For instance, in the case that the reference field 104 is composed of one or more infrared LEDs, the video camera 106 can include an infrared filter to help selectively detect the infrared radiation generated by the infrared LEDs.

Alternatively, in the case that the reference field 104 includes passive reference elements, the system 100 can include one or more radiation emitting sources (not shown), such as infrared sources. These sources can generate light or infrared radiation which is reflected from the passive reference elements. The video camera 106 receives the reflected light or infrared radiation.

Any kind of electronic device 110 can receive and process image information captured by the video camera 106. For example, the electronic device can include a personal computer, a game console, a set-top box, and so on. FIG. 1 generically represents features of the electronic device 110 which are relevant to the processing of the image information. To facilitate explanation, FIG. 1 shows the electronic device 110 as being implemented by a single integral unit. However, the electronic device 110 can also represent plural units that are communicatively coupled together.

To begin with, the electronic device 110 can include a camera interface module 112. The camera interface module 112 receives image information from the video camera 106 and optionally converts this information into a form that allows it to be further processed by the electronic device 110. For instance, the camera interface module 112 can optionally convert any aspect of the format of the received image information to any other format. The electronic device 110 can implement the camera interface module 112 as a video card or like device which couples to a motherboard (not shown) of the electronic device 110.

The electronic device 110 also includes a position determination module 114. The purpose of the position determination module 114 is to analyze the image information and generate position information therefrom. The position information reflects the position of the user-manipulated device 102 (and associated reference field 104) in relation to the video camera 106. To perform this function, the position determination module 114 can first identify the reference field 104 within the image information, to thereby generate reference information.

The position determination module 114 can detect the reference field 104 in various ways. In one technique, the reference field 104 includes one or more reference elements that have visual characteristics which are distinguishable from other objects in the image information. For instance, suppose that the reference elements emit infrared radiation. In this implementation, the video camera 106 (equipped with an infrared filter) can produce image information having bright spots against a darkened background, where the bright spots represent the reference elements that are affixed to the user-manipulated device 102. In another case, suppose that the reference elements emit primary color light. In this implementation, the video camera 106 can produce image information having bright primary-colored spots which can be distinguished from other objects in the scene (which typically do not have the same kind of monotonic primary color characteristics). These reference elements can even more readily be detected by placing them against a darkened background (such as by placing the reference elements on a black plate of the user-manipulated device 102).

The position determination module 114 can also distinguish the reference field 104 based on a telltale pattern formed by an arrangement of reference elements within the reference field 104. For example, this function can be performed by comparing a pattern of candidate reference elements with predetermined and pre-stored patterns. If the pattern of elements in the image information matches one of the predetermined patterns, then the position determination module 114 can conclude that a bona fide reference field 104 has been detected in the image information. FIGS. 2 and 3 shows exemplary patterns of reference elements that can be associated with the presence of a valid reference field 104.

Potentially more reliable positioning information can be extracted by using more unique reference elements. For example, a reference field 104 can be composed of reference elements have different shapes, colors, and so forth. One or more reference elements can also be lifted off a plane with respect to the other reference elements to facilitate discrimination of these elevated reference elements from other (non-elevated) reference elements.

The above-described image analysis functions can be performed by analyzing pixel information in the image information. The output of this stage of the position determination module 114 is reference information that reflects the presence of one or more reference fields 104. Alternatively, at a particular moment in time, the video camera 106 may not capture a scene that encompasses any reference fields 104. In this case, the output at this stage of processing will indicate that no reference fields 104 have been detected.

The position determination module 114 next converts the determined reference information into position information. The term "position information" in the implementation of FIG. 1 refers to the position of the reference field 104 relative to a point of origin, such as the video camera 106, a display device, an object being presented on the display device, etc. The term "position information" can also describe the orientation of the reference field 104 relative to the point of origin. For example, in one case, the user can use the user-manipulated device 102 to point to a target object being displayed on a display screen (to be described in further detail below). In this case, the position information may describe the position and orientation of the user-manipulated device 102 (and associated reference field 104) relative to the display screen or other point of origin.

The task of converting reference information into position information varies depending on numerous environment-specific factors. In one case, this transformation can be expressed by one or more geometrical mapping equations. The mapping equations can take into consideration any one or more of: the position of the reference elements with respect to one or more fixed reference points; the position of the reference elements with respect to each other; the movement of the reference elements, and so on. The equations can include various correction factors to account for the distortion produced by the video camera 106, as well as other potential considerations. A calibration procedure can be use to calibrate the positioning determination module 114, and to thereby facilitate determination of various such correction factors.

Generally, with one reference element in the reference field 104, the position determination module 114 can track the two-dimensional location of the reference element. With two reference elements, the position determination module 114 can track the movement of the reference elements in three dimensional space (assuming that the camera 106 is viewing the reference elements straight on). With two reference elements, the position determination module 114 can also measure the z-axis rotation of the user-manipulated device 102 (where the z-axis defines an axis formed between the video camera 106 and the device 102). The use of additional reference elements further enhances the amount of positioning detail that can be extracted from the reference information. For example, with four reference elements, the position determination module 114 can track both the three-dimensional location and three-dimensional orientation of the user-manipulated device 102.

The position information gleaned from the image information can be supplemented by other input, e.g., as obtained from the other input device(s) 116. One such other input device that can be used is any kind of inertial sensor or combination of inertial sensors. As well known, inertial sensors provide positioning information that is relative in nature. For example, an inertial sensor can provide position information that indicates that the user has moved the user-manipulated device 102 up five inches at a particular rate. The position determination module 114 can use this kind of supplemental position information to help validate the accuracy of position information obtained via the image information. In other instances, there are times when the video camera 106 cannot "see" the reference field 104. In this case, the positioning information obtained from the inertial sensor(s) (or other supplemental input device) can be used to overcome the "blind spots" in the camera 106's image information.

The position determination module 114 feeds its generated position information to an application module 118. The application module 118 represents any kind of application that can perform any prescribed set of functions. For instance, the application module 118 can represent a simulation application (such as a flight simulator application), a game application of any variety, an Internet navigation application, and so on. In any event, the application module 118 uses the position information to control its behavior. The specific nature of this control depends on the nature of the application module 118 itself.

The application module 118 can provide any kind of output which reflects the outcome of its control behavior. For example, the application module 118 can generate a visual output via a display interface module 120. The display interface module 120 presents the visual output on a display screen 122 of a display device 124. The display device 124 may present a television set of any kind, a computer monitor of any kind, and so on.

Consider various specific exemplary scenarios to facilitate understanding of the nature of the control affected by the system 100. In one application, the application module 118 displays some kind of marker 126 on the display screen 122, such as a pointer or a cursor. The user can move the marker 126 to a different location on the display screen 122 by pointing to the different location on the display screen 122 with the user-manipulated device 102. To perform this task, it is first assumed the video camera 106 can "see" the reference field 104 that is affixed to the user-manipulated device 102 during the above-described movement. The position determination module 114 extracts reference information from the image information produced by the video camera 106, and then converts the reference information to position information. The application module 118 uses the position information to adjust the position of the marker 126 on the display screen 122. This can be performed by mapping the position information to an on-screen position using one or more mapping equations. The on-screen position reflects an object that the user is pointed to using the user-manipulated device 102.

In another application, the application module 118 presents an object 128 to aim at in a shooter-type game. The user can aim at the object 128 by pointing the user-manipulated device 102 at the object 128. (In this context, the user-manipulated device 102 can optionally be shaped like a weapon.) The position determination module 114 and the application module 118 work in the way described above to translate the physical movements of the user-manipulated device 102 to corresponding movement of the on-screen field of focus of the user's weapon. In either the first or second applications, the user can perform supplemental actions with the user-manipulated device 102, such as by selecting a particular object that is being pointed to, shooting a particular object, and so on. In another case, the user may use the above-described techniques to aim at and control some other object that is not necessarily displayed by a displayed device, such as stereo equipment, an appliance, etc.

The above two examples feature the case in which the user points to an object using the user-manipulated device 102.

However, in other applications, the user can use the user-manipulated device 102 to achieve other kinds of control. For example, the user can make a characteristic gesture using the user-manipulated device 102 (such as by waving the user-manipulated device 102 in a predetermined manner). The position determination module 114 in conjunction with the application module 118 can recognize the gesture by comparing video captured by the video camera 106 with predetermined patterns. The application module 118 can execute a control operation based on the type of gesture made by the user, as identified by the position information.

In another exemplary case, a game application may "watch" the movements of the user by tracking the position of the reference field 104 in the manner described above, and then providing appropriate control based on the user's movement. For instance, a shooting game may attempt to virtually fire at the user based on the user's movements. Here, the user is not attempting to fire upon an on-screen object, but is attempting to avoid being fired upon.

In another exemplary case, an application can monitor the movements of the user in the manner described above. The application can provide an on-screen character or other object that mimics the movements of the user. Still other applications of the system 100 are possible.

FIGS. 2 and 3 show two of many kinds of reference fields that can be employed in the system 100 of FIG. 1. In FIG. 2, a reference field 200 comprises a linear array of reference elements. In this case, the reference field 200 includes three reference elements, although other implementations may include additional reference elements or fewer reference elements. The reference elements may comprise infrared LEDs, visual-spectrum LEDs, or other kinds of light emitting mechanisms. Alternatively, the reference elements can comprise passive elements, such as reflective dots. In either case, the reference elements can be fixed to a darkened (e.g., flat black) background so as to facilitate the detection of these elements in the image information captured by the video camera 106.

In FIG. 3, another reference field 300 includes a triangular arrangement of reference elements. Any of the features of the reference field 200 described above (with reference to FIG. 2) can be applied to the reference field 300 of FIG. 3. In addition, the reference field 300 of FIG. 3 shows that three reference elements located at the vertices of the triangle are affixed to a single plane, while another reference element 302 is positioned off that plane. This offsetting can be achieved by physically securing the reference element 302 to the plane so that it extends out farther than the other reference elements. Or the offsetting can be achieved by virtually lifting the reference element 302 off the plane (e.g., using a lens or other mechanism). The arrangement of FIG. 3 (which includes one or more offset reference elements) potentially allows more detailed positioning information to be extracted from the image information.

A.2. Implementation B: User-Manipulated Video Camera (FIGS. 4 and 5)

Figure 4:
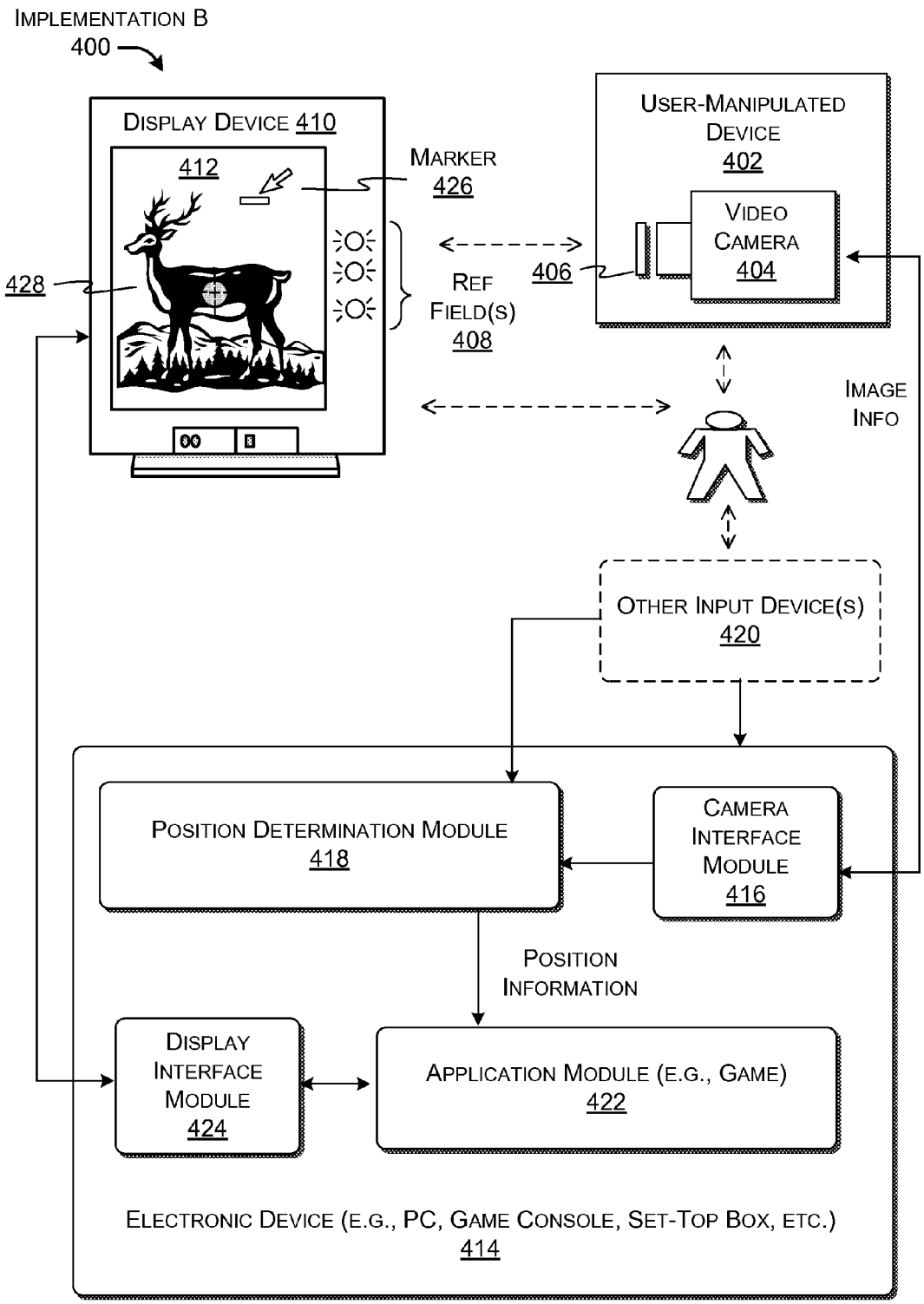
FIG. 4 shows a second implementation of a system for controlling an application based on image information.
Figure 5:
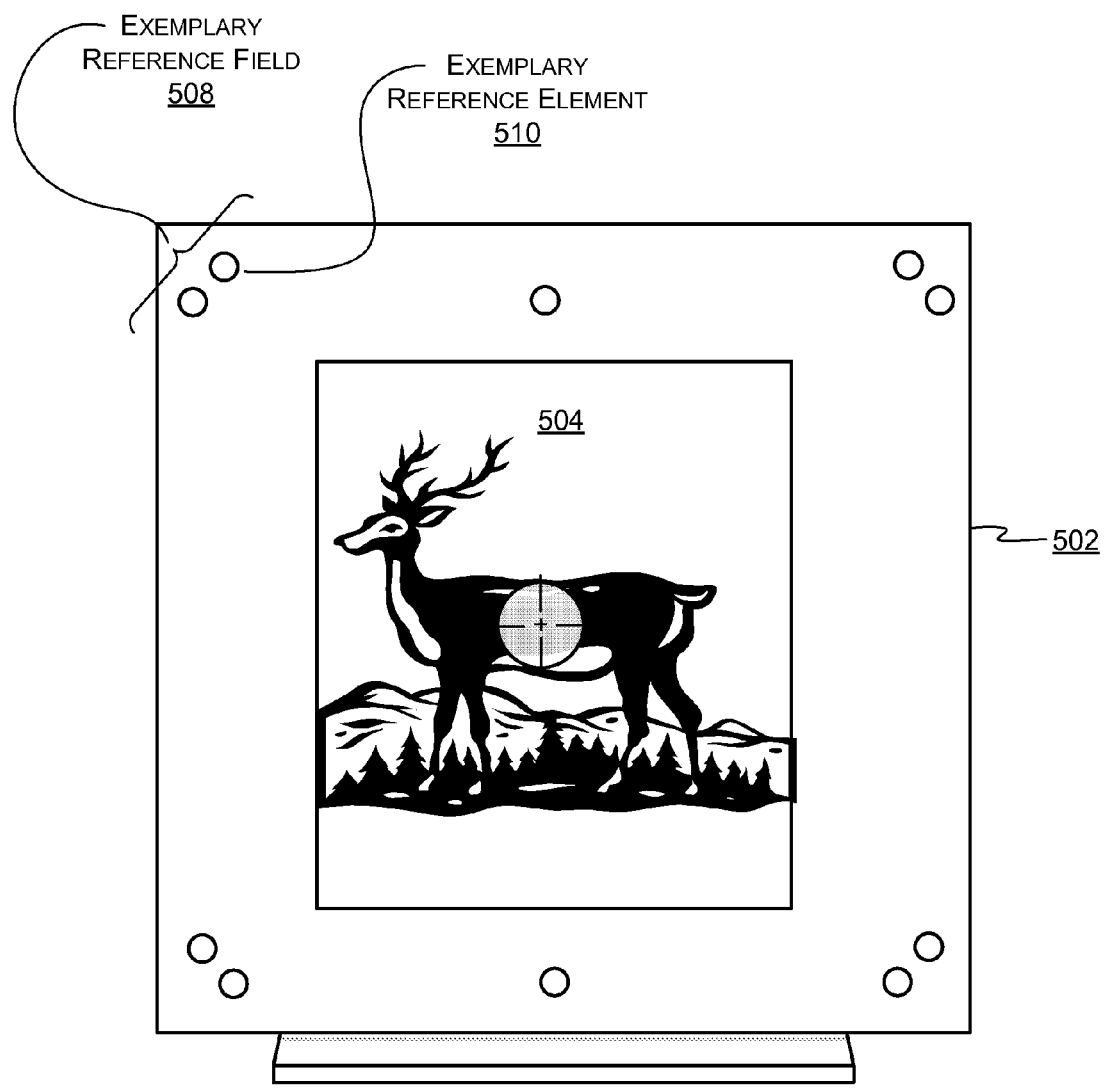
FIG. 5 shows an exemplary configuration of plural reference fields that can be coupled to a display device in the system of FIG. 4.

FIG. 4 shows a second implementation of the strategy for controlling an application based on image information obtained from a video camera. Namely, FIG. 4 describes a system 400 in which the user-manipulated device 402 includes a video camera 404 coupled thereto. For instance, the user-manipulated device 402 can comprise a remote control device having a video camera 404 on its distal end. In this configuration, the video camera 404 can be pointed at whatever the remote control device is pointed at. In another example, the user-manipulated device 402 can comprise any kind of game controller. For example, the game controller can comprise a weapon having the video camera 404 at its distal end. Again, in this configuration, the game controller can be pointed at whatever the remote control device is pointed at. In another case, the user-manipulated device 402 can represent, in part, some other device which already includes a video camera, such as a mobile telephone. Or a video camera per se (without any other functionality) can be used as the user-manipulated device 402. In addition, the video camera 404 can be used in conjunction with any kind of filter 406, such as an infrared filter.

In this system 400, the one or more reference fields 408 are positioned with respect to a display device itself 410, rather than the user-manipulated device 402. For instance, the display device 410 can include a casing which defines a periphery portion, bordering a display screen 412. One or more reference fields 408 can be positioned on this casing.

In the case in which the reference fields 408 represent discrete physical elements, these reference fields can be implemented as any kind of active reference elements (infrared LEDs, visible-spectrum primary color LEDs, etc.), any kind of passive reference elements (reflective dots, etc.), and so forth. The reference elements can be fixed to a dark-colored substrate to facilitate discrimination of these elements among other objects. Further, as will be described, different reference fields 408 can include different respective telltale patterns of reference elements to facilitate detection and interpretation of these reference fields 408.

In another implementation, the reference fields 408 may comprise reference information that is displayed on the display screen 412 by an electronic device 414. For example, the electronic device 414 can display information having telltale characteristics along the borders portions of the display screen 412 or at other locations of the display screen 412. These reference fields 408 can be recognized by virtue of the colors used to display these fields 408, the shapes of these fields 408, the patterns of elements that compose each field 408, and/or any other characteristic(s) of these fields 408.

The electronic device 414 and its associated peripheral components include a camera interface module 416, position determination module 418, other input device(s) 420 (including, for instance, one or more inertial sensors), application module 422, and display interface module 424. These modules operate in a manner that is related to that described above with reference to FIG. 1. In the case of FIG. 4, the position determination module 418 can determine position information of the video camera relative to a point of origin, such as one or more reference fields 408 that are positionally associated with the display device 410. The generation of the position information can be performed using suitable geometric equations, as supplemented by various correction factors. Since the image information directly shows both the target of the user's control action and the reference field(s) 408, the system 400 can rely on simplified calibration procedures, or can omit these procedures altogether.

The system 400 can be applied to various scenarios. In a first scenario, the user can use the user-manipulated device 402 to move the position of a marker 426 on the display screen 412. In a second scenario, the user can use the user-manipulated device 402 to aim at some game-type object 428 on the display screen 412, such as in the context of a shooter-type game. In another case, the user may use the above-described techniques to aim at and control some other object that is not necessarily displayed by a displayed device, such as stereo equipment, an appliance, etc. Further, as before, the system 400 can also be used in other scenarios in which the user uses the user-manipulated device 402 to perform some action other than pointing to an on-screen object. For example, the position determination module 418 can detect gestures made by the user using the user-manipulated device 402.

FIG. 5 shows one exemplary display device 502, including plural reference fields. The reference fields are disposed around the periphery of the display screen 504. In this case, the reference fields represent discrete mechanisms that are coupled to the casing of the display device 502, but the fields can also be electronically incorporated as part of the graphical information being displayed on the display screen 504. A user-manipulated device 506 includes a video camera (not shown) that captures a scene that encompasses at least a part of the display device 502, including at least a subset of the reference fields.

One of the reference fields is exemplary reference field 508. This reference field 518 includes two reference elements, including exemplary reference element 510. Note that the reference fields disposed in the respective corners of the display device 502 have different respective patterns. This helps the position determination module 418 get its "bearings" in detecting and interpreting the reference fields in the image information. The reference field arrangement shown in FIG. 5 is merely illustrative of many types of possible arrangements. Other arrangements can provide additional or fewer references fields than are shown in FIG. 1. Also, other arrangements can use different patterns to implement the respective individual reference fields.

The position determination module 418 can provide the most reliable position information when it "sees" all of the reference fields. But the position determination module 418 can also provide position information when it sees only a subset of the reference fields, such as three of the six reference fields.

A.3. Processing Functionally (FIG. 6)

Various components of the electronic devices (110, 414) (of FIGS. 1 and 4) can be implemented by processing equipment. FIG. 6 shows a general depiction of processing functionality 602 that can be used to implement any of components of the electronic devices (110, 414).

The processing functionality 602 can include various volatile and non-volatile memory, such as RAM 604 and ROM 606, as well as one or processing devices 608. The memory (604, 606) can store instructions which perform the various functions described above when executed by the processing devices 608. For example, a subset of such instructions can implement the position determination module (114, 418) of FIGS. 1 and 4. The processing functionality 602 also optionally includes various media devices 610, such as a hard disk module, an optical disk module, and so forth. The processing functionality 602 also includes an input/output module 612 for receiving various inputs from the user, and for providing various outputs to the user. The processing functionality 602 can also include one or more network interfaces 614 for exchanging data with other devices. One or more communication buses 616 communicatively couple the above-described components together.

Figure 6:
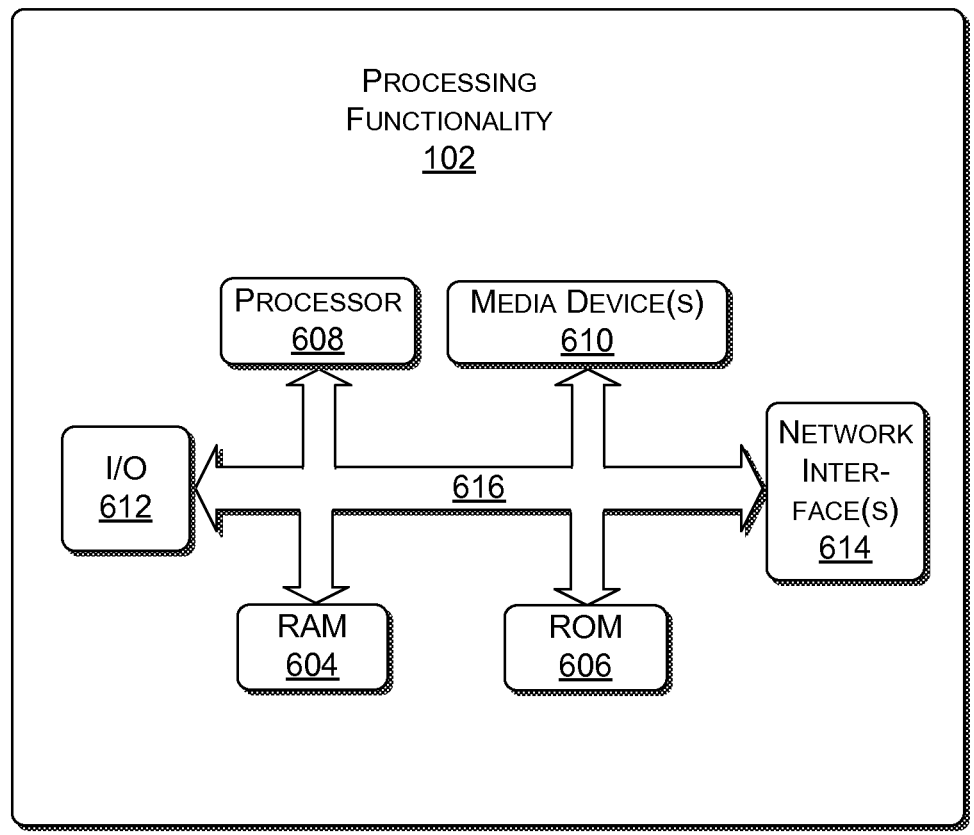
FIG. 6 shows an exemplary configuration an electronic device that can be used in the systems of FIGS. 1 and 4.

In various applications, the processing functionality 602 shown in FIG. 6 can include additional modules or can omit one or more of the modules shown in FIG. 6.

B. Exemplary Processes (FIG. 7)

Figure 7:
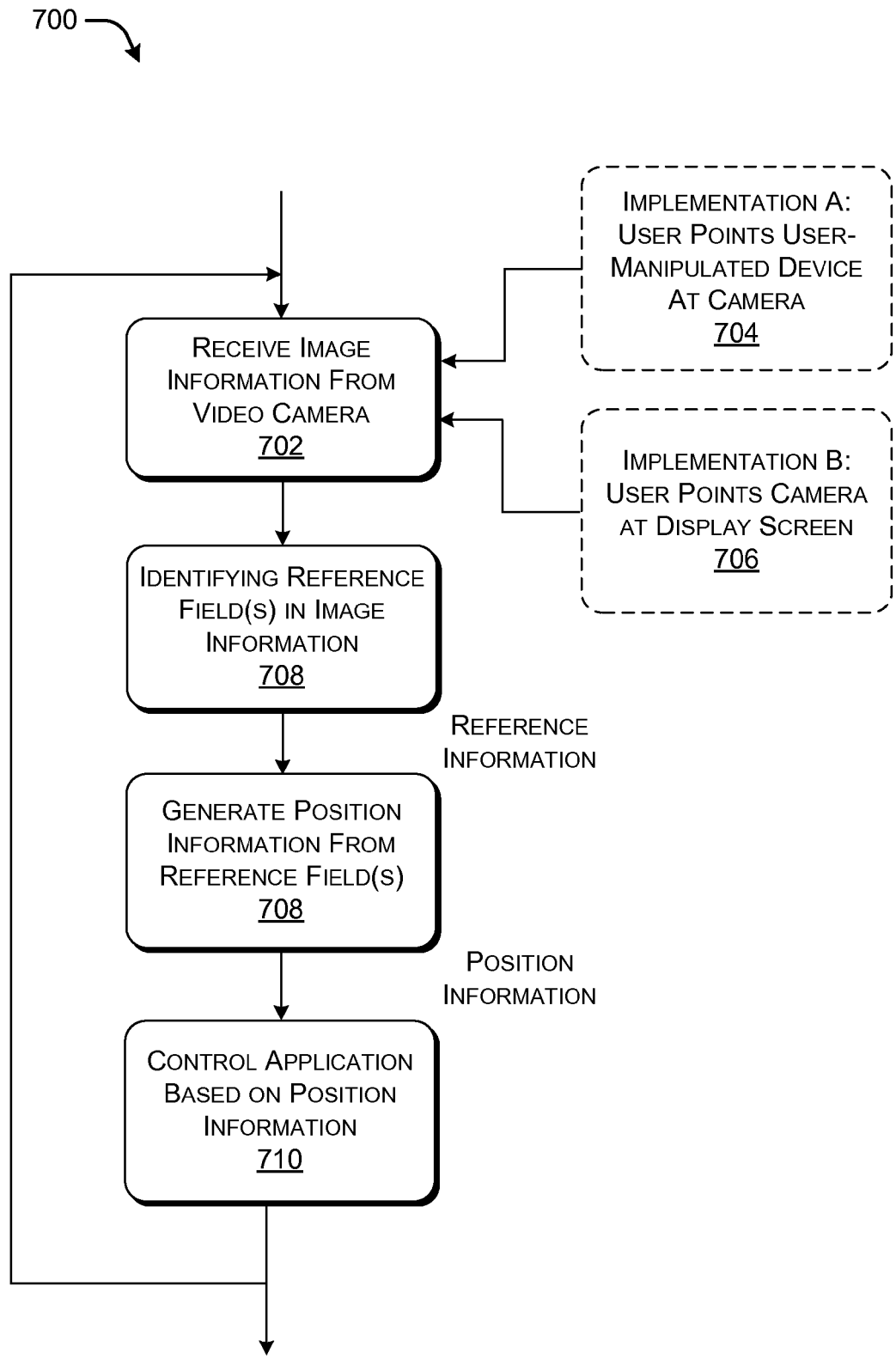
FIG. 7 shows an exemplary procedure which explains the behavior of the systems of FIGS. 1 and 4.

FIG. 7 shows an overview of one exemplary procedure 700 that can be implemented by the systems (100, 400) of FIGS. 1 and 4, or by some other system. To facilitate discussion, certain operations are described as constituting distinct steps performed in a certain order. Such implementations are exemplary and non-limiting. Certain operation can be grouped together and performed in a single operation, and certain operations can be performed in an order that differs from the order employed in the examples set forth in this disclosure. Since the nature of the operations performed in the procedure 700 have already been described in Section A, this section serves primarily as a summary of those operations.

In block 702, the electronic device (110, 414) receives image information from the video camera (106, 404). The image information may include one or more reference fields (104, 406). According to block 704, in the first implementation, the image information is obtained in response to the user pointing a user-manipulated device 102 at some on-screen object or some other object that is not necessarily displayed on the screen (or performing some other action using the user-manipulated device 102), wherein the user-manipulated device 102 includes one or more reference fields 104 coupled thereto. According to block 706, in the second implementation, the image information is obtained in response to the user pointing the user-manipulated device 402 at the display screen 412 or some other object that is not necessarily displayed on the screen (or performing some other action using the user-manipulated device 402), where the user-manipulated device 402 includes the video camera 404 coupled thereto, and the display device 410 includes one or more reference fields coupled thereto.

In block 708, the position determination module (114, 418) determines the presence of one or more reference fields in the received image information, to thereby provide reference information.

In block 710, the position determination module (114, 418) generates position information based on the identified reference information.

In block 712, the application module (118, 422) affects some kind of control based on the position information provided by the position determination module (114, 418). Such control may, in one instance, involve determining what object the user is pointing at using the user-manipulated device (102, 402).

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Conclusion

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
   receiving image information from a video camera;
   identifying at least one reference field of a user-manipulated device based on colors and shapes the comprise the at least one reference field, the at least one passive reference field reflecting light;
   determining identified reference information based on the at least one passive reference field;
   receiving supplemental positioning information from an inertial sensor, the supplemental positioning information used to compensate for blind spots in the image information received from the video camera;
   generating position information based at least in part on the identified reference information and the supplemental positioning information, the position information expressing a position of the user-manipulated device relative to the video camera, the position information generated at least in part by mapping the position of the at least one passive reference field to one or more fixed reference points; and
   controlling an application based on the generated position information.

2. The method of claim 1, wherein the user-manipulated device is pointed toward a display device.

3. The method of claim 1, further comprising:
   receiving inertial sensor information from an inertial sensor, the user-manipulated device including the inertial sensor; and
   generating the position information based at least in part on the identified reference information and the inertial sensor information.

4. The method of claim 1, further comprising receiving the image information from the video camera in response to the user-manipulated device being positioned to point at a particular object presented by the display device.

5. The method of claim 1, wherein:
   the pattern of elements is associated with the user-manipulated device; and
   another pattern of elements is associated with another user-manipulated device.

6. The method of claim 1, wherein:
   the at least one reference field includes a first reference field and a second reference field;
   a first plurality of reference elements of the first reference field are arranged in a first pattern; and
   a second plurality of reference elements of the second reference field are arranged in a second pattern that is different from the first pattern.

7. The method of claim 1, wherein the user-manipulated device comprises a game controller.

8. The method of claim 1, wherein the game controller comprises a data glove device, a wristband device, a headband device, a shoe-borne device, or any combination thereof.

9. The method of claim 1, wherein:
   the video camera is stationary; and
   a field of view of the video camera encompasses an area in which a user is expected to operate the user-manipulated device.

10. The method of claim 1, wherein the video camera sweeps back and forth to encompass an area in which a user is operate the user-manipulated device.

11. An electronic device comprising:
    a processor; and
    storage media including instructions executable by the processor to perform acts comprising:
      receiving image information from a video camera;
      identifying a plurality of reference fields of a user-manipulated device based on the image information, each reference field of the plurality of reference fields including reference elements, the plurality of reference fields identified based on colors of the reference elements and a pattern of the reference elements;
      receiving supplemental positioning information from an internal sensor, the supplemental positioning information used to compensate for blind spots detected in the image information received from the video camera;
      generating position information based on the plurality of reference fields and the supplemental positioning information, the position information identifying a position of the user-manipulated device relative to the video camera; and
      providing the position information to an application.

12. The electronic device of claim 11, wherein the user-manipulated device includes one or more control actuators.

13. The electronic device of claim 12, wherein the one or more actuators comprise a button actuator, a joystick actuator, a knob actuator, a steering mechanism actuator, or any combination thereof.

14. The electronic device of claim 11, wherein the image information is received from two or more video cameras.

15. The electronic device of claim 11, wherein the position information is generated via one or more geometrical mapping equations based on a position of the reference elements with reference to one or more fixed reference points.

16. The electronic device of claim 11, wherein the position information is generated by one or more geometrical mapping equations based on a position of the reference elements with reference to each other.

17. A system comprising:
   a gaming console comprising a memory including instructions and a processor to execute the instructions to perform acts comprising:
      receiving image information from a plurality of video cameras, the plurality of video cameras capturing the image information from a plurality of angles;
      identifying at least one reference field of a user-manipulated device based on a color of the at least one reference field, based on a shape of the at least one reference field, and based on a pattern of reference elements that comprise the at least one reference field;
      identifying reference information based on the at least one reference field;
      receiving supplemental positioning information from an inertial sensor of the user-manipulated device;
      based on the reference information and the supplemental positioning information, generating position information that identifies a position of the user-manipulated device relative to the two or more video cameras; and
      controlling one or more applications based on the position information.

18. The system of claim 16, wherein the reference elements comprise passive elements that do not generate electromagnetic radiation.

19. The system of claim 16, wherein the reference elements reflect at least one of infrared radiation or visible-spectrum light.

20. The system of claim 17, wherein the reference elements are placed on a back plate of the user-manipulated device.

* * * * *